July 28, 1942.   C. F. JENSEN   2,291,228
VACUUM EVAPORATOR
Filed June 19, 1940
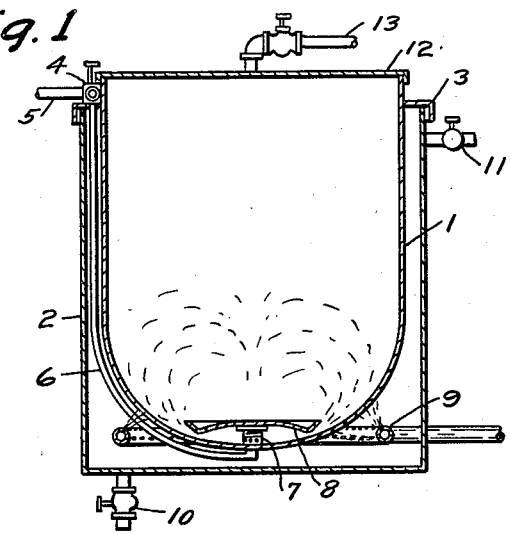
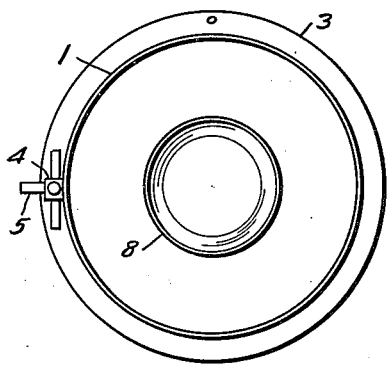
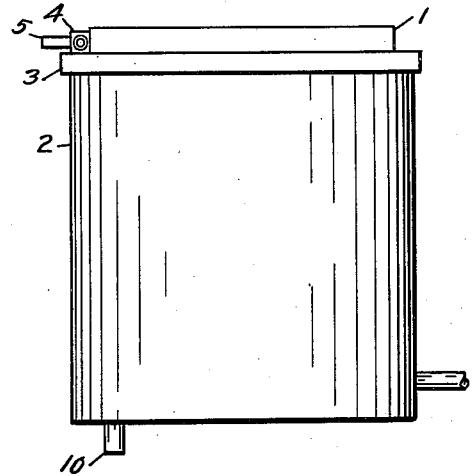
INVENTOR.
Christian Frederik Jensen
BY
ATTORNEY.

Patented July 28, 1942

2,291,228

UNITED STATES PATENT OFFICE 2,291,228

VACUUM EVAPORATOR

Christian Frederik Jensen, Garden City, N. Y.

Application June 19, 1940, Serial No. 341,361

3 Claims. (Cl. 159—16)

The purpose of this invention is to provide apparatus for accelerating the circulation in solutions of high viscosity during the last stage of evaporation.

The invention is a vacuum chamber with a deflecting baffle in the lower end under which a fluid may be injected, and the chamber is surrounded by an enclosed jacket with a steam injector in the form of a perforated hollow ring positioned to inject steam against a portion of the wall of the chamber adjacent the edge of the baffle, and the jacket may have a controlled air inlet, and the fluid injecting means may also be connected to steam or air.

Evaporation in vacuum is known and is used in the industry particularly for evaporating solutions to a higher viscosity and also in the preparation of dry extracts.

The advantage of evaporating under vacuum as compared with evaporating at atmospheric pressure is that a much greater temperature difference is obtained between the heating medium and the solution and therefore a correspondingly higher heat transmission per square foot of heating surface. More important, however, is the fact that the boiling point of the solution under high vacuum is considerably lower than under atmospheric pressure, and the evil effect of the presence of air during the evaporation is eliminated.

In the medicinal industry, for instance, the solutions to be evaporated are often of varied nature. Generally they are extracts of herbs that must be evaporated to a high viscosity or to dryness and as the active ingredient in herb extracts may be destroyed by exposing them to a temperature above 100° C. it is therefore necessary that such solutions be evaporated under reduced pressure in order to give the active ingredient a gentle treatment.

Where moderate quantities must be evaporated to dryness in vacuum it is preferred to use a chamber or vessel with a hemispherical bottom to facilitate removal of the finished product.

In the apparatus herein described use is made of the fact that the distribution and velocity of the heating steam over the heating surface increases the heat transmission and consequently the capacity of the apparatus.

Vacuum evaporators heretofore used for this purpose are of the double bottom type where the inner vessel is heated by steam under pressure in the heating chamber, whereas in this apparatus the object is to utilize the heating steam more efficiently by applying the steam directly and only to that portion of the surface of the vessel contacted by the solution to be evaporated. This increases the heat transmission considerably and augments the circulation of the solution. Therefore rapid evaporation is achieved, and this is of great importance especially during the last stage when the viscosity of the solution is high.

The apparatus herein described is particularly adapted for limited production such as is required in the pharmaceutical industry and in experimental laboratories. It consists in the main of a vessel with a hemispherical bottom, hereinafter called the boiler, and this is positioned freely in a steam mantle forming a jacket, or it may be a combination double bottom steam boiler in which the mantle is brazed or welded on the boiler. The heating steam is supplied through a pipe ring having perforations or horizontal or vertical slits therein which is positioned around the bottom of the boiler in such a manner that the steam ejected through the perforations or slits is uniformly distributed over the effective heating surface in a belt-like zone. A drain connection with a valve therein is provided in the lower end of the mantle for condensation of the steam.

In order to prevent vacuum in the mantle which might result from insufficient heating steam that might cause an accumulation of condensate in the steam chamber an air valve is provided on the steam mantle which makes it possible to maintain atmospheric pressure in the steam chamber which is of great importance during the last stage of the preparation of dry extracts, because most of these extracts may partly be ruined should the temperature exceed 100° C.

In the drawing the apparatus is shown as it may be made, wherein:

Figure 1 shows a vertical section substantially through the center of the apparatus.

Figure 2 is a plan view with the cover omitted.

Figure 3 is a side elevation showing the entire apparatus formed of a complete unit.

The apparatus comprises a boiler 1 positioned in a mantle 2 and held by a flange 3 resting on the upper edge of the mantle. A three way valve 4 is positioned on the flange and this is provided with nipples 5, one of which may be connected to a supply for the solution, another connected to a steam supply, and the other open to the air. A tube 6 extends downward from the valve 4 between the wall of the boiler and mantle and this is connected to a boss 7 in the lower end of the boiler and the boss is covered with a curved disc 8, which is threaded on the boss so that it is adjustable in relation to the boiler in order to regulate the area between the edges thereof and the boiler surface. The outer edge of the disc is cone shaped in order to evenly distribute the incoming solution against the wall of the boiler.

Around the outside of the boiler and inside of the mantle is a pipe ring 9 having perforations or slits in the surface thereof toward the boiler for ejecting steam in a belt like zone around the lower part of the boiler. The mantle is provided with a drain connection 10 for condensation of the steam and also an air valve 11 to prevent the temperature in the mantle exceeding 100° C.

The boiler is shown as having a cover 12 with a vacuum connection 13 therein, and whereas the cover is shown flat it will be understood that it may be of any shape or design and must be of sufficient strength to withstand the vacuum.

The belt-like area directly contacted by the steam from the ring 9 provides a specific heating zone and as this is located around the periphery of the disc 8 the solution spray passing outward around the disc will contact this heated surface and this will cause it to pass upward and backward and then downward into the center of the disc as indicated by the dash lines, whereby a high heat transmission is accomplished. The solution is therefore uniformly and immediately distributed over the active heating surface with a velocity corresponding to the difference in pressure between the outside and inside of the boiler.

The fact that the cold solution is evenly distributed over the active heating surface, causes the temperature difference between the heating steam and the boiling solution to become maximum, consequently the heat transmission increases, the same being proportionate with the difference in temperature between the heating steam and the boiling solution obtained through this operation, and furthermore the positioning of the intake in the center of the bottom of the boiler and in the manner described tends to overcome the formation of foam, and the vigorous circulation breaks down any formation of surface film.

The vigorous circulation will counteract the influence of the increasing viscosity on the heat transmission, and when the viscosity of the solution has increased to such an extent that the heat transmission has become considerably reduced, the valve 4 may be turned so that direct steam is injected into the concentrated solution through the pipe or tube 6 and the boss 7, and this steam expanding into a larger volume makes it possible to maintain vigorous circulation until the extract is completed.

This injected steam does not participate as a source of heat when you consider that the total heat of, for instance steam, at 100° C. and at 40° C. is substantially the same. The only action that takes place is that the injected steam adjusts itself to the pressure in the boiler, and expanding into a larger volume causes an increased circulation which in turn brings about an increase in heat transmission and accelerates the evaporation very considerably.

The valve 4 may also be turned to admit air to stop boiling in the boiler as the air entering the lower part of the solution will be immediately effective for this purpose.

By using the air valve 11 on the mantle 2 provision is made for preventing the temperature in the mantle exceeding 100° C. thereby providing means for assuring that the active ingredient in the solution is not exposed to too high temperature.

It will be understood that changes may be made in the apparatus without departing from the spirit of the invention. One of which changes may be in the shape, design, or size of the vessel or boiler, another may be in the use of other means for providing a surrounding mantle or steam jacket, and still another may be in the use of other means for supplying the solution, steam, or air to the apparatus.

The construction will be readily understood from the foregoing description. In use the device may be set up as shown and described and with steam injected against a belt-like area around the lower part of the boiler as shown in Figure 1, the solution to be evaporated, is supplied through the valve 4 and is injected through the member 7 against the heated wall in the belt-like zone and this accelerates the circulation causing it to pass upward, over, and downward at the center, and as the viscosity increases steam may be sent in, or should boiling start, this can be immediately stopped by sending in air.

The air relief valve of the mantle is open at the start and is closed as the viscosity increases, however, this may be opened slightly to prevent vacuum in the mantle, and also to prevent high temperatures.

Having thus fully described the invention, what I claim as new and desire to secure by Letters Patent, is:

1. A vacuum evaporator comprising a vessel forming a boiler, a laterally ejecting nozzle in the lower end of the boiler, a disc covering said nozzle, means heating an area of belt-like formation around the wall of the boiler adjacent the periphery of the disc, and means supplying fluids to said nozzle.

2. An evaporator as described in claim 1, characterized in that the periphery of the said disc is conical shaped providing an upwardly and outwardly sloping surface directing the solution against the heated area of the wall.

3. An evaporator as described in claim 1, having a steam jacket surrounding said boiler.

CHRISTIAN FREDERIK JENSEN.